United States Patent [19]
Gibson et al.

[11] 3,766,000
[45] Oct. 16, 1973

[54] LOW THERMAL EXPANSION COMPOSITES

[75] Inventors: James O. Gibson; Robert L. Schumacher, both of Richland; Kay L. Myler, Benton City, all of Wash.

[73] Assignee: McDonnell Douglas Corporation, Santa Monica, Calif.

[22] Filed: Mar. 2, 1970

[21] Appl. No.: 15,525

[52] U.S. Cl. ............. 161/170, 106/55, 106/56, 106/57, 106/69, 264/29, 264/60, 264/332
[51] Int. Cl. .......................................... C04b 35/70
[58] Field of Search ............. 117/26, 27, 28, 100 H, 117/100 B, 140; 252/62; 106/55, 56, 57, 69; 161/181, 176, 158, 170, 165; 264/60, 29, 332; 260/88.5

[56] References Cited
UNITED STATES PATENTS

| | | | |
|---|---|---|---|
| 2,432,890 | 12/1947 | Hersh | 260/88.5 |
| 3,140,190 | 7/1964 | DiLazzaro | 106/56 |
| 3,607,608 | 9/1971 | Siefert | 161/170 |
| 3,470,003 | 9/1969 | Waylett | 106/56 |
| 3,334,040 | 8/1967 | Conrad et al. | 204/266 |
| 3,055,831 | 9/1962 | Barnett et al. | 252/62 |
| 3,484,183 | 12/1969 | Dickson et al. | 252/62 |
| 3,400,181 | 9/1968 | Battista et al. | 106/56 |
| 2,811,457 | 10/1957 | Speil et al. | 252/62 |
| 3,429,722 | 2/1969 | Economy et al. | 106/55 |

FOREIGN PATENTS OR APPLICATIONS 986,179  3/1965  Great Britain ..................... 106/56

Primary Examiner—Daniel J. Fritsch
Attorney—Max Geldin

[57] ABSTRACT

Process for dispersing fibers in a refractory metal compound phase comprising coating fibers, e.g. graphite fibers, with a mixture of a refractory metal compound of extremely small particle size, e.g. NbC of 0.02 micron size, and sufficient binder, e.g. polymerizable furfuryl alcohol and maleic anhydride, to form a slurry, forming the coated fibers to the desired shape and heating the formed coated fibers at high temperatures in the range of about 40% to about 98% of the melting point of the refractory compound, e.g. about 3,000°C, to form a composite. The article produced by the above process is characterized by low thermal expansion values.

4 Claims, 3 Drawing Figures

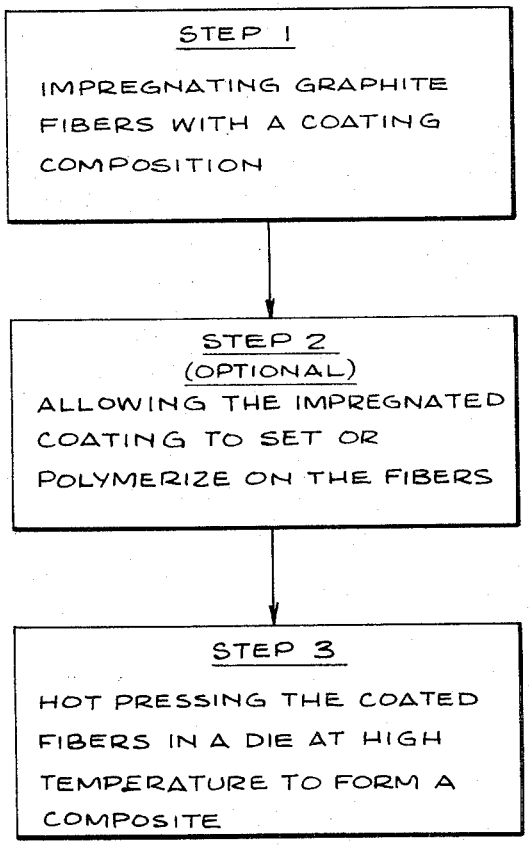
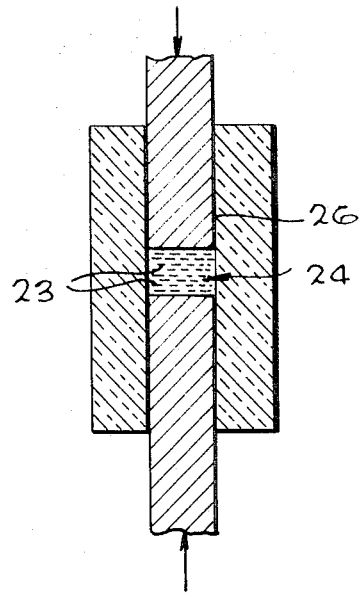
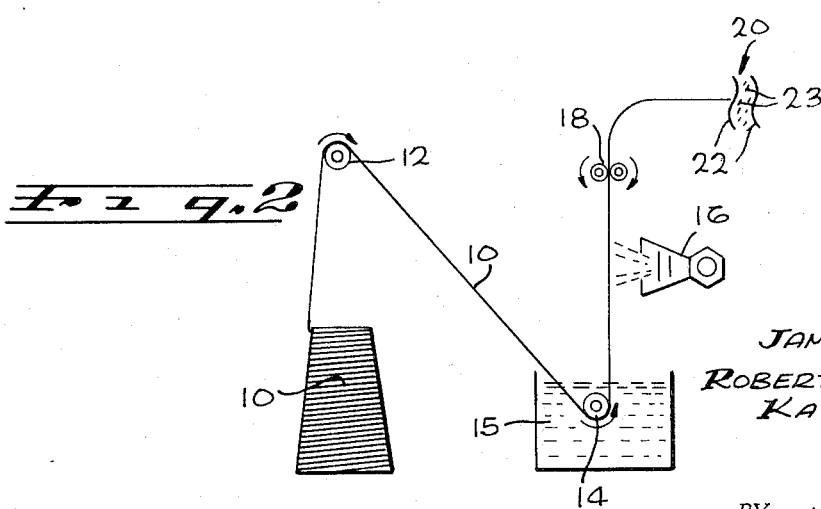
JAMES O. GIBSON
ROBERT L. SCHUMACHER
KAY L. MYLER
INVENTORS
BY
ATTORNEY

LOW THERMAL EXPANSION COMPOSITES

This invention relates to composites and particularly to a composite having graphite fibers dispersed in a matrix of a refractory metal compound or a refractory metal compound mixture, and characterized by low thermal expansion, and to a process for making the above described composites.

It is well known that for most devices such as those operating by mechanical, electrical, chemical means and the like, the operating efficiency is directly proportional to the operating temperature. Operating temperature is in most cases, however, limited by the properties of the structural or operating members supporting the parts of such devices. Furthermore, the higher the desired operating temperature, the fewer materials there are available for structural parts which can withstand elevated temperatures. Gas turbines, thermionic emitters, and the like are examples of devices which are particularly limited by their materials of construction.

The manufacture of structural parts usually requires the joining of dissimilar materials as by brazing, glueing, and welding. Too often when the device having joined structural parts is subjected to thermal cycling, separation of the joined parts becomes a serious problem. Separation takes place when the coefficients of thermal expansion (CTE) are not closely matched. Thus, it is most desirable to be able to specify and obtain CTE values for structural members which are to be used in high temperature devices. High strength of the structural member is also desirably maintained at the same time.

At temperatures above 2,200°C graphite and certain graphite composites are the only materials available which are generally considered to exhibit sufficient strength and long term dimensional stability for use in devices operating at elevated temperatures. As a result, graphite and certain graphite composites are widely used in structural members.

In certain types of engines using hydrogen gas as the working fluid, graphite and in some cases graphite composites have failed catastrophically. The reason is that above 600°C hydrogen reacts chemically with carbon or graphite at an extremely rapid rate, forming volatile hydrocarbons.

The problems such as those above described have stimulated extensive research directed to the development of a satisfactory structural material having the following properties: (1) resistance to hydrogen and other types of chemical corrosion; (2) low compressive creep at operating temperatures, and most desirably below about 4%; (3) high strength, e.g. preferably having a room temperature flexural strength above 10,000 psi; and finally (4) a low coefficient of thermal expansion, e.g. of the order of about $(5.0)(10^{-6})$in./in. °C.

It was found in the course of research that most metal carbides including niobium carbide, are relatively stable in flowing hydrogen up to their melting pointe e.g. NbC-3,500°C. Composites of graphite and NbC which have been developed heretofore have proved unsatisfactory mainly because of failure to meet the cirteria for compressive creep strength and also thermal stress resistance, the latter property being primarily dependent on obtaining low values for the linear coefficient of thermal expansion (CTE). These composites are made conventionally by mechanically blending calcined petroleum coke (an acicular or needle coke) having a particle size of 44 to 250 microns in size, with niobium carbide particles of about 6 micron size. The blended powders are then hot pressed to achieve a high density billet.

Graphite composites produced according to the method disclosed in the copending application of James O. Gibson, Robert L. Schumacher, and Kay L. Myler, Ser. No. 15,526 filed of even date herewith, exhibit a low coefficient of thermal expansion and exceptionally high flexural strength. Resistance to hydrogen and other chemical corrosion is also good. However, the coefficient of thermal expansion is not as low as desired. The composites are produced according to the above copending application by thoroughly mixing to a substantially homogeneous state, fibers, e.g. graphite fibers, and refractory metal compounds of extremely small particle size, e.g. NbC of 0.02 micron particle size, together with sufficient liquid e.g. water, to form a slurry. The water is then removed from the slurry, the slurry residue dried to remove remaining water, and then formed as by pressing. The formed piece is then heated to high temperatures.

By contrast, the composites of the present invention are characterized by a lower coefficient of thermal expansion than the composites produced by the above described method.

Thus, it has now been unexpectedly discovered that the above disadvantages of graphite and graphite composites are substantially completely eliminated by the process of the present invention. The superior graphite composites of the invention are produced by treating fibers, e.g. graphite fibers, with a mixture of a refractory metal compound or refractory metal compound mixture of extremely small particle size, e.g. NbC of 0.02 micron size, and sufficient binder to form a slurry, and forming a coating on the fibers. The coated and impregnated fibers are then heat treated at very high temperatures, e.g. 3,000°C for graphite fibers coated and impregnated with NbC. If desired, prior to heat treating the coated fibers can be formed to the desired shape. By hot pressing, the coated fibers can be formed and heat treated in one operation. There is thus produced a composite having graphite fibers dispersed in a matrix of refractory metal compound, e.g. NbC.

Briefly, the process of the invention for producing a composite of low thermal expansion comprises treating fibers selected from the group consisting of amorphous carbon fibers, graphite fibers, pyrolytic graphite fibers, natural organic fibers, synthetic organic polymer fibers, inorganic fibers, and mixtures thereof, with a coating composition comprising (a) a refractory metal compound or refractory metal compound mixture, in the form of particles of a size not larger than about 0.6 micron; and (b) a binder for bonding said particles of refractory metal compound to said fibers, sufficient said binder being employed to form a slurry; forming a coating on said fibers, and heating the coated fibers at a temperature in the range of from about 40% to about 98% of the melting point of the refractory metal compound or refractory metal compound mixture.

Composites produced by the method of the invention are significantly superior to prior art composites, exhibiting lower coefficients of expansion, greater resistance to thermal shock, low compressive creep at operating temperature and times when used for structural parts, and have of the order of 2 ½ times the flexural strength. At the same time the composites exhibit good resistance to hydrogen and other chemical corrosion.

The use of submicron sized refractory metal particles permits better bonding of the particles to the fibers than is possible using larger sized particles. Furthermore, the submicron particle size also permits the employment of lower processing temperatures than are possible if larger sized particles e.g. 44 micron are used.

A further advantage is that the coating process can be performed continuously when yarns, tapes and similar materials are to be coated or impregnated.

The invention will be more easily understood by reference to the description below of certain preferred embodiments of the invention taken in connection with the accompanying drawing wherein:

FIG. 1 is a flow diagram of the process of the invention; and

FIGS. 2 and 3 are schematic representations of a system for carrying out the process of the invention wherein graphite yarn is coated continuously.

Referring now to FIG. 1, fibers such as graphite fibers are first impregnated with a coating composition, then as an optional step the impregnated coating is permitted to set of polymerize on the fibers, followed by hot pressing the coated fibers in a die at high temperatures to form a composite.

A system for carrying out the process is shown schematically in FIGS. 2 and 3. Here, graphite yarn 10 is drawn by drive pulley 18 over pulleys 12 and 14 through coating composition 15. The impregnated coated yarn is then passed by forced air drying furnace 16 where the coating on the yarn is set or polymerized. The coated yarn is then fed to a station 20 where it is chopped by blades indicated at 22 into short lengths 23. Referring to FIG. 3, the chopped pieces of coated yarn 23 are then placed in a die 26 and formed therein by hot pressing at high temperatures to produce a composite 24.

Thus, the invention comprises a process for dispersing fibers in a refractory metal compound phase comprising coating and/or impregnating fibers with a composition comprising a mixture of very small particles of the nature of about 0.6 micron or less and preferably about 0.02 micron, of a refractory metal compound or refractory metal compound mixture, and sufficient binder to form a slurry. The impregnated coated fibers can then be heat treated at high temperatures in the range of from about 50% to about 98% of the melting point of the refractory metal compound or compound mixture to form a composite. Alternately, prior to heat treatment the coating on the fibers can be permitted to set or harden by polymerization, oxidation or equivalent, reaction by the binder causing greater adherence of the small particles of refractory metal compound in and around the interstices of the fiber. After the coating has set on the fibers they can be formed to the desired shape. Forming of the coated fibers without setting of the coating is possible but not preferred. The formed coated fibers are then heated at high temperatures in the range of from about 50% to about 98% of the melting point of the refractory metal compound or compound mixture. Forming and heat treating of the fibers can be achieved simultaneously by hot pressing. There is formed by the above process a dispersion of fibers in a matrix of refractory metal compound. The binder is usually decomposed at the high temperatures employed.

The fibers which can be used in the process according to the invention include amorphous carbon fibers, pyrolytic graphite fibers, graphite fibers, natural organic and synthetic organic polymer fibers, and inorganic fibers, and mixtures thereof. The natural fibers include animal fibers such as silk and wool, and vegetable fibers such as those derived from seed hairs as cotton and kapok, those derived from leaves producing hard fibers such as henequen, sisal and istle, and those derived from stems producing soft or bast fibers such as flax, hemp, jute, kenaf, and ramie. The synthetic organic polymer fibers which can be used include among others those such as acetate, acrylic, azlon, modacrylic, nylon, olefin, polyester, rayon, rubber, saran, spandex, triacetate, vinal, and vinyon. The inorganic fibers include among others BN, B and $SiO_2$ fibers.

Of the above mentioned fibers, the amorphous carbon fibers, pyrolytic graphite fibers and graphite fibers are the most preferred for their strength and heat resistance.

When the natural and synthetic fibers mentioned above are employed the carbon contained therein undergoes carbonization beginning at temperatures of about 300°C in a vacuum when the fibers would start losing hydrogen and breaking organic bonds. When temperatures of about 2,000°C have been reached, carbonization of most organic fibers is about 98% complete, and at temperatures of about 2,500°C carbonization is about 99.9% complete. At a temperature of about 2,500°C most carbon-containing fibers undergo almost complete graphitization as distinguished from carbonization in a few minutes. Graphitization takes place at even more rapid rates as the temperature is increased above 2,500°C.

Even if final heat treatment were below complete graphitization temperatures, coated synthetic fibers and cloth would be desirable since carbon fibers and cloth are strong and useful. In certain instances, for example when low thermal conductivity were desired, carbon fibers might be more desirable than graphite fibers.

Fibers can be coated in the form of single fibers or yarns consisting of many strands of fibers. Such fibers and yarns can for example be twisted and braided to produce yarns, rope and twine, woven or knit to produce cloth; shredded or blown to produce wool. Examples of fiber forms which can be coated include among others cloth, mats, bats, felt, fabric, sleeving, roving, tape and bulk. The maximum practical fiber diameter to be coated is about 0.125 inch. Smaller widths down to about 0.000026 inch or smaller can be coated. Yarns, cloth and other consolidated fiber forms can be cut if desired for coating or coated as a continuous length.

Thus, the fibers to be coated has a diameter in the range of from about 0.125 to about 0.000026 inch, a preferred range being about 2 microns to about 15 microns.

The coating or impregnating composition for the fibers as noted previously includes very small particles of a refractory metal compound or refractory metal compound mixture and sufficient binder to produce a slurry.

Refractory metal compounds which can be employed in the process of the invention are those which are stable at high temperatures and form high melting compounds. Examples of suitable compounds are as follows: the carbides, borides, silicides, nitrides, phosphides, sulfides, and oxides of niobium, tantalum, zirconium, titanium, vanadium, molybdenum, hafnium, tungsten, rhenium, uranium, thorium, plutonium, promethium, boron, silicon an mixtures thereof. It is of course not preferred to employ any specific compounds within the above described classes of compounds which are not sufficiently stable at high temperatures, and/or which do not form high melting compounds. Specific examples of such refractory metal compounds are set forth in the working examples hereinafter.

When the refractory metal compound comprises the metal oxides above mentioned in conjunction with graphite or carbon fibers, the graphite or carbon fibers should be protected with a thin film of a material such as $WSi_2$ and/or processing and application temperatures should be kept below about 1,200°C. Thus, oxides which can be employed include $ThO_2$, $UO_2$, $ZrO_2$, $TiO_2$, $HfO_2$, $Pm_2O_3$ and $PuO_2$. Although composites produced from the metal oxides are not generally useful at very high temperatures, these composites are still desirable because of their high strength and low CTE properties.

By the term "refractory metal compound," is meant to include those compounds mentioned above and in this disclosure as well as other high heat resistant materials including mixtures of the above materials, alloys and the like.

A particularly preferred system utilizing mixtures of the above mentioned materials is the $HfB_2$—$WSi_2$—$SiC$ system as the ceramic phase as 20 to 80 percent by volume with about 80 to 20 percent by volume graphite fiber. In such refractory compound mixture, the proportions of $HfB_2$, $WSi_2$ and $SiC$ can vary. A preferred refractory metal compound mixture of the above type contains proportions of about 66 parts of $HfB_2$, 10 parts of $WSi_2$ and 10 parts $SiC$, by weight. Such mixture in a preferred composition can be employed with about 14 parts by weight of graphite fibers. The above mixture provides extraordinary oxidation resistance and excellent thermal shock properties when incorporated in graphite composites.

The carbon contained in the binder, e.g. thermosetting polymers as pre-polymers, adds carbon to the system as result of decomposition of the binder during heat treatment. Therefore, it is preferred, although not necessary, to add additional amounts of compound mentioned above to react with refractory metal carbide. the carbon forming the metal carbide. The amount to be added should be just sufficient to maintain the stoichiometry of the metal to carbon ratio at 1 or slightly more than 1.

In general, the smaller the particle size of the refractory metal compound the better. Preferably the particles are of a size not larger than about 0.6 micron, and usually are in the range of from about 0.0004 micron to about 0.6000 micron. Most desirably the particle size for the refractory metal compound is one which is approximately one-tenth the diameter of the fiber or smaller. As an example, if graphite fibers to be used have a diameter of 6.6 microns, then the particles of refractory metal compound are about 0.6 micron in size or smaller. This ratio of particle size to fiber diameter facilitates diffusion of the particles in and around the fiber interstices.

The coating composition for the fibers as noted previously includes very small particles of a refractory metal compound and sufficient binder to produce a slurry.

The term "binder" as used herein and in the claims is meant to define a substance or fluid (capable of flow) which produces or promotes adhesion, cohesion, or bonding of the refractory metal particles and fibers. Thus, the function of the binder is to cause the small particles of refractory metal compound to stick or adhere to the fibers. Adhesiveness or stickiness is the chief requirement of the binder. Preferably the binder is in the form of a liquid at a temperature of coating but this can be a viscous liquid as long as flow characteristics are retained. Examples of binders which can be used are many including among others: (1) Protein or protein derivatives, e.g. glue; (2) Starch, sugars, dextrans, dextrins, cellulose, glycogens, pentosans or gums and their derivatives, e.g. arabic, dammar, tragacanth, agar; (3) Thermoplastic synthetic resins, e.g. acrylate resins, cyanoacrylate adhesives, polyvinyl acetate, polyvinyl alcohol; (4) Thermosetting synthetic polymers and pre-polymers e.g. phenolic resins including resorcinol resins, epoxy resins, alkyd resins, polybenzimidazoles, amino resins including for example, urea-aldehyde, e.g. urea-formaldehyde, melamine-aldehyde resins, and polyurethane resins, furan resins, homopolymers of furfuryl alcohol, copolymers of phenol with furfural or furfuryl alcohol, and copolymers of furfural, silicone resins, and mixtures of these resins and polymers; (5) Natural resins and bitumins, e.g. asphalt, rosin, residues from the distillation or oxidation of mineral oils to give for example blown asphalt, petroleum resins; residues from the distillation the tars to give for example coal-tar pitch, wood-tar pitch, pine-tar pitch, residues from the distillation of fusible organic substances to give for example fatty acid pitches; (7) Inorganic adhesives such as (a)hydraulic cements e.g. gypsum cements, calcium silicates, portland cement and (b) others e.g. sodium silicate, litharge-glycerine, magnesium oxychloride.

Of the above, organic binders are preferred, the thermosetting polymers and pre-polymers being most desireable. The reason for this is that after impregnation and coating of the fibers, the binder can be set so that further handling is facilitated.

The term "prepolymers" are used in the specification and claims is meant to denote resin solutions containing all the elements necessary for cure.

Examples of specific commercially available binders which can be used include among others, furfuryl alcohols, and furfuryl alcohol resins of which the material marketed as "Varcum" is representative; "Eternium paint" understood to be a petroleum pitch available from Allied Chemical; and "Durez" understood to be a phenol-formaldehyde type of resin available from Hooker Chemical Company.

A particularly preferred binder is based on furfuryl alcohol with from about 1% to about 50% by weight maleic anhydride.

The ratio of binder to refractory metal compound can range from about 25% by weight of binder and about 75% by weight of refractory metal compound to about 95% by weight of binder and about 5% by weight of refractory metal compound. In general, the binder is added in amounts sufficient to produce a slurry of the refractory metal compound. The exact viscosity of the slurry will depend on the manner of impregnation of the fibers and the amount of refractory metal compound required in the coating. Thus, the slurry can range from a very thin to a very thick slurry.

The fiber, yarn or other fiber form can be impregnated in any suitable manner. Thus, yarns or tapes can be passed through a trough containing the binder-refractory metal compound slurry, or such slurry can be applied by spraying, dipping, rolling, coating, doctor blade, brushing. Immersion or dipping of the fibers into the slurry is most preferred because better coverage is obtained by this method.

Thus, the coating can be exposed to ambient conditions to harden or conveniently passed through a curing oven if desired. By the latter method, coated yarns, tapes and the like can be obtained and the coating hardened continuously, in the manner shown in FIG. 2.

After the fiber, yarn, cloth or other fiber form has been coated and/or impregnated, the newly coated fiber, cloth or equivalent can be heat treated directly at temperatures of about 40% to about 98%, preferably about 50% to about 98%, of the melting point of the refractory metal compound or compound mixture.

Time of such heat treatment can vary depending upon factors such as the particular refractory compound employed, temperature and for example, billet size. For example, heat treating time can range from about 10 to about 20 minutes. However heat treatment temperature and/or time are not considered critical. Coated heat treated fibers have commercial application, for example a graphite yarn coated with $HfB_2 \cdot WSi_2 \cdot SiC$ can be used as a high-temperature heating element in the manner of nichrome wire used presently in toasters. Graphite cloth coated and heat treated, but without forming, finds similar applications.

When a shaped article is desired, forming is carried out after coating but prior to heat treatment. It has been found that in general, forming is more readily accomplished when binders comprising thermosetting polymers and pre-polymers are used and are permitted to harden or set before forming, although this is not necessary. Setting of the coating on the impregnated fibers can be accomplished in any convenient manner. Most thermosetting resins and polymers will set at temperatures in the range of from about ambient to about 200°C although higher temperatures can be employed. Usually a temperature of about 200°C permits relatively rapid setting of the coating. Appropriate cure catalysts or curing agents can be added to speed up the setting process, as is well known in the art. Examples of such catalysts or curing agents are the organic acids, anhydrides and amines. The exact catalyst or agent, and the amount employed will depend on the particular resin and catalyst system as is well understood in the art.

The coated fibers for example in the form of coated yarn having the coating set or hardened thereon can be chopped into short lengths, e.g. down to about 0.05 inch, placed in a die and vacuum hot pressed at elevated temperatures to produce a composite. The forming step to form a composite from the coated fibers, yarns and other fiber forms can be carried out in various ways including vacuum hot pressing, high-energy rate forming, hot isostatic pressing, explosive compaction, extrusion, hot rolling, and hot swaging, to mention a few. In general, pressures employed can range from about 2,000 psi to about 500,000 psi, depending on the method employed. In vacuum hot pressing pressures of about 3,000 psi to about 20,000 psi can normally be used. Alternatively, the coated yarn or equivalent can be wound directly into mandrels prior to heat treatment to produce any desired complex shape such as airfoils, hollow cylinders, cones, truncated cones, frusta and the like. The formed piece can then be heat treated with or without applied pressure to produce a composite.

The final step of heat treating the composite can be performed separately from the compaction or forming step or can be performed simultaneously as in vacuum hot pressing. As previously noted, the temperature at which heat treatment is preferably conducted is in the range of from about 50% to about 98% of the specific melting point of the refractory metal compound or refractory metal compound mixture, and generally ranging from about 2,000°C to about 3,200°C. Thus, for example, in the case of NbC, having a melting point of about 3,250°C, heat treatment is conducted in the range of about 1,625° to about 3,185°C.

In a modification of the above described process, short lengths of fibers in the range of about 2 inches to about 6 microns, and a diameter in the range of from about 0.125 to about 0.000026 inch and preferably in the range of from about 2 microns to about 15 microns, can be added to the coating or impregnating composition together with additional amounts of refractory metal compound. The amounts of such additions can range from about 1 volume percent up to about 90 volume percent, based on total slurry solids.

A composite produced using a coating and impregnating composition containing the short lengths of fiber and additional refractory metal compound is characterized by a low coefficient of thermal expansion and superior strength in the against-the-grain direction.

The following examples are given for the purpose of illustrating the invention and are not to be construed as a limitation thereof.

EXAMPLE 1

A coating composition is first formed by mixing together the following ingredients:
- 8.2 parts by weight maleic anhydride
- 29.5 parts by weight niobium carbide of 0.02 micron particle size.
- 3.3 parts by weight niobium metal of 5 micron particle size.
- 59.0 parts by weight Varcum binder understood to comprise chiefly furfuryl alcohol.

The above composition is characterized by high viscosity.

Graphite yarn is then drawn continuously through the above composition effecting a coating thereon. A typical graphite yarn (Thornel-25) has the following properties.

| | |
|---|---|
| Plies/yarn | 2 |
| Filament/ply | 720 |
| Twist-ply/ply | 1.6 |
| Yarn diameter | about 0.02 inch |
| Yield | 5600 Yd/lb. |
| Breaking Strength | about 8 lb. |

A typical graphite fiber of which the graphite yarn is composed has the following properties:

| | |
|---|---|
| Modulus | $25 \times 10^6$ psi |
| Specific Modulus | $490 \times 10^6$ in. |
| Strength | $180 \times 10^3$ psi |
| Specific Strength | $3.5 \times 10^6$ psi |
| Density | 1.42 g/cm³ or 0.051 lb./in.³ |
| Diameter | 7.4 microns or 0.00029 in. |

The yarn emerging from the high viscosity slurry is uniformly covered with a coating of the slurry. The coated yarn is then dried by exposure to hot air at a temperature of about 200°C. The hot air causes the coating to thermally set or harden on the yarn to form a strong adherent coating of the NbC on the yarn and individual fibers of which the yarn is composed.

After hardening of the coating, the coated yarn is then chopped into pieces about 0.375 inch long and placed in a graphite die case. The coated fibers are then vacuum hot pressed in the die at about 3,150°C and a pressure of about 3,000 psi for 10 minutes to form a billet. The composite billet contains 65 volume per cent graphite fiber and 35 volume per cent NbC.

The billet is found to have the following properties set forth below in Table I.

TABLE I

| PROPERTY | UNITS | VALUES |
|---|---|---|
| Linear Coefficient of Thermal expansion 0° to 2500°C | $(10)^{-6}$ in./in./°C | 4.6 |
| Cumpressive Creep at 2500°C, 4000 psi load-for 1 hour | % | <0.1% |
| Flexural Strength at 20°C | psi | 28,000 |
| Carbide Particle Size | | Fine |
| Hydrogen Corrosion resistance | | Satisfactory |

EXAMPLE 1a

For purposes of comparison but not in accordance with the invention, a conventional type of composite is made by blending 35 parts by weight calcined petroleum coke of an acicular or needle coke type having a particle size of 44 to 250 microns in size, ith 65 parts by weight niobium carbide particles of about 6 micron size. The blended powders are hot pressed at 3,150°C and 3,000 psi forming a high density billet. The properties of the composite or billet are given below in Table II.

TABLE II

| PROPERTY | UNITS | PRIOR ART Valves Linear coefficient of thermal |
|---|---|---|
| expansion 0° to 2500°C | $10^{-6}$ in./in./°C | 7.0 to 9.0 |
| Cumpressive Creep at 2500°C, 4,000 psi load for 1 hour | % | 3.0% to 8% |
| Flexural Strength at 20°C | psi | 9,000 |
| Carbide Particle Size | | Coarse |
| Hydrogen Corrosion resistance | | Satisfactory |

It is readily seen from a comparison of Table I and Table II that the composite billet produced by Example 1, according to the invention, is superior to that produced by prior art methods such as in Example 1a. The invention composite is characterized by a lower coefficient of expansion, i.e. 4.6, as opposed to 7.0 to 9.0 for the above prior art composite; <0.1% compressive creep as opposed to 3.0 to 8% for the above prior art composite; flexural strength of 28,000 psi as compared to 9,000 psi for the prior art composite, and a finer carbide particle size than the prior art composite.

EXAMPLE 2

A coating composition is first formed by mixing together the following ingredients:
   65 parts by weight silicone resin
   35 parts by weight HfC of 0.05 micron particle size.
   The resulting composition is mixed together until a homogeneous mixture is formed.

Graphite yarn composed of 1,440 fiber strands of 6.6 micron size is then drawn through the above mixture to effect a coating thereon. The yarn substantially uniformly covered with a coating of the silicone resin-HfC mixture is then dried by exposure to hot air at a temperature of about 200°C. The heated air causes the coating to thermally set or harden on the yarn bonding the HfC particles on the yarn and individual fibers thereof.

After exposure to hot air and hardening of the coating on the yarn, the yarn is wound around a mandrel followed by heat treating at a temperature 3,500°C. The formed piece is removed from the mandrel and found to possess properties similar to the billet produced in Example 1.

EXAMPLE 3

A coating composition is formed of the following ingredients:
   45 parts by weight $ThO_2$ of 0.55 micron particle size
   55 parts by weight epoxy resin.

Short lengths, of about 0.1 in. rayon fibers of 20 micron diameter are impregnated with the above composition by dipping. After impregnation, the coated fibers are passed by conveyor belt through a forced hot air oven at a temperature of about 175°C to set the coating on the fibers. After setting of the coating, the fibers are placed in an extruder and extruded to form e.g., a hexagonal shape. The extruded members are then subjected to heat treatment at 1,200°C. In this case, the heat treating temperature is reduced to avoid a carbon-thorium reaction. The resulting composite is found to have properties comparable to that of Example 1.

EXAMPLE 4

A coating composition is formed by intimately mixing together the following ingredients:
   37 parts by weight TiN of 0.04 micron particle size
   63 parts by weight phenol-formaldehyde resol. Cotton sleeving composed of 85 micron size fibers is passed continuously through the above composition to effect coating and impregnation thereof. The coated sleeving is then exposed to a forced hot air oven where the coating is thermally set or hardened. The coated sleeving is then wound around a mandrel and heated to 2,800°C. The formed piece is removed from the mandrel and found to possess properties comparable to the composite produced in Example 1.

EXAMPLE 5

A coating composition is formed by intimately mixing together the following ingredients:
   65 parts by weight $WB_2$ of 0.6 micron particle size
   35 parts by weight urea-formaldehyde resin.

Woolen yarn of many strands of 100 micron diameter fiber is passed through the above composition to effect coating and impregnation thereof. The coated yarn is then passed through a hot forced air oven at a temperature of 200°C to thermally set the coating on the yarn. The coated yarn is passed a second time through the above coating composition to effect another coating, followed by thermally setting the coating by passage through the forced air oven. The yarn having the two hardened coatings of urea-formaldehyde resin-$WB_2$ is fed into a box where it is chopped into lengths of about 0.375 in. The chopped pieces of coated yarn are then placed in a die and vacuum hot pressed at a temperature of 2,825°C and a pressure of about 3,000 psi to form a billet. The billet is found to possess properties comparable to the composite produced according to Example 1.

EXAMPLE 6

A coating composition is formed by intimately mixing together the following ingredients:
  30 parts by weight $TaSi_2$ of 0.02 micron particle size
  70 parts by weight melamine-formaldehyde resin.

Nylon tape composed of many fibers of 20 micron diameter is passed continuously through the above composition to effect coating and impregnation thereof. The impregnated tape is then passed through a hot forced air oven at a temperature of 200°C to thermally set the composition on the fibers of the tape. The coated tape is then wound around a mandrel and heat treated at a temperature of 2,315°C. The formed piece is then removed from the mandrel and found to possess properties comparable to that of the composite formed according to the procedure of Example 1.

EXAMPLE 7

A coating composition is formed by intimately mixing together the following ingredients:
  50 parts by weight $TaS_2$ of 0.02 micron particle size
  50 parts by weight silicone resin.

Pyrolytic graphite fibers of 15 micron diameter and 0.4 in. in length are sprayed thoroughly with the above composition to effect impregnation and coating thereof. The coated fibers are then passed through a hot forced air oven at a temperature of 150°C and then sprayed again with the coating composition. The coated fibers are then passed again through the hot oven to thermally set the coating on the fibers. The coated fibers are then placed in a die and vacuum hot pressed at 2,900°C and 4,500 psi to form a billet. The billet is found to possess properties comparable to that of Example 1.

EXAMPLE 8

A coating composition is formed by intimately mixing together the following ingredients:
  8.2 parts by weight maleic anhydride
  29.52 parts by weight $ZrO_2$ of 0.02 micron particle size
  3.28 parts by weight zirconium metal of 0.02 micron particle size.
  59.0 parts by weight Varcum binder available from the Varlacoid Chemical Co. and understood to comprise mainly furfuryl alcohol.

Acetate fiber mats of fibers having a diameter of 10 microns are dipped into the above composition and then permitted to air dry for 5 hours at ambient temperature to set the coating. The mats are then placed one on top of each other to form composites containing 10 layers of such mats. The composites are then hot pressed at 1,200°C and 10,000 psi. It is noted that such oxide-fiber system requires lower heating temperatures. The resulting composite is found to have properties comparable to that of Example 1.

EXAMPLE 9

A coating composition is formed by intimately mixing together the following ingredients;
  45 parts by weight $HfB_2$ of 0.03 micron particle size
  55 parts by weight phenol-furfuryl alcohol copolymer.

Graphite yarn composed of individual fibers of 6.6 micron diameter is passed continuously through the above composition, followed by thermal setting of the coating by exposure to a hot forced air oven at a temperature of 175°C. The coated yarn is then wound around a mandrel and heated to 3,000°C. The formed piece is removed from the mandrel and found to have properties comparable to the composite of Example 1.

EXAMPLE 10

An impregnating composition is formed by intimately mixing together the following ingredients:
  8.2 parts by weight maleic anhydride
  29.5 parts by weight $TiB_2$ of 0.04 micron particle size
  8.5 parts by weight Ti metal of 0.04 micron particle size.
  59.0 parts by weight Varcum binder Graphite yarn composed of 1,440 individual fibers of 6.6 micron diameter is passed continuously through the above coating composition to effect impregnation and coating thereof. The coated yarn is then passed through a hot forced air oven at a temperature of 200°C to thermally set the coating on the yarn and fibers of which it is composed. The coated yarn is then chopped into lengths of about 0.375 in. The chopped pieces are then formed by hot swaging at 2,800°C. The formed piece is found to possess properties comparable to the composite formed in Example 1.

EXAMPLE 11

An impregnation composition is formed by intimately mixing together the following ingredients:
  30 parts by weight $B_4C$ of 0.1 micron particle size
  70 parts by weight phenol-formaldehyde resol.

Graphite fibers of 12 micron diameter and 0.4 in. length are impregnated with the above composition by dipping. The impregnated coated fibers are then passed by conveyor belt through a forced hot air furnace at a temperature of 175°C to thermally set the coating by polymerization of the resol to a resite. The coated fibers are then placed in a die and vacuum hot pressed at a temperature of 2,200°C and a pressure of 3,000 psi. The resulting composite is found to possess properties comparable to that of Example 1.

EXAMPLE 12

An impregnating composition is prepared by intimately mixing together the following ingredients:
  15 parts by weight BN of 0.04 micron particle size
  20 parts by weight $W_2C$ of 0.04 micron particle size
  55 parts by weight phenol-formaldehyde resol
  10 parts by weight urea-formaldehyde resin Amorphous carbon fibers having a diameter of 7 microns and a length of about 0.5 inch are immersed in the above composition to effect coating and impregnation thereof. The coated fibers are then dried by passage through a hot forced air oven at a temperature of 200°C. The coating hardens on exposure to the heat and oxygen of the air. The coated fibers are then placed in a die and vacuum hot pressed at 2,775°C and a pressure of 5,000 psi. The composite is found to have properties comparable to that of Example 1.

EXAMPLE 13

An impregnating composition is prepared by intimately mixing together the following ingredients:
  10 parts by weight $HfB_2$ of 0.02 micron particle size 10 parts by weight WSi$_2$ of 0.02 micron particle size
10 parts by weight SiC of 0.02 micron particle size
10 parts by weight maleic anhydride
60 parts by weight Varcum binder Graphite yarn having the same properties as the yarn used in Example 1 is drawn continuously through the above composition effecting a coating thereon. The coated yarn is then passed through a hot forced air oven at a temperature of 200°C. The yarn emerges from the oven with the coating hardened or set on the yarn and constituent fibers thereof. The coated yarn is then wound around a mandrel and heated to 2,000°C. The formed piece is removed from the mandrel and found to possess properties comparable to the composite of Example 1. In addition, the composite possesses superior oxidation resistance and thermal shock properties.

EXAMPLE 14

An impregnating composition is prepared by intimately mixing together the following ingredients:
29.5 parts by weight NbC of 0.02 micron particle size
8.2 parts by weight maleic anhydride
3.3 parts by weight of niobium metal
59.0 parts by weight Varcum binder Graphite cloth having properties similar to the yarn used in Example 1 is drawn continuously through the above composition to impregnate and effect a coating thereon. The coated cloth is then passed through a hot forced air oven at a temperature 200°C to thermally set the coating on the cloth. The coated cloth is then wound on the mandrel, placed in a die and vacuum hot pressed at a temperature of 3,150°C and 3,000 psi. The resulting composite containing 37 volume percent NbC and 63 volume percent fiber is found to possess properties comparable to the composite of Example 1. In addition, the composite is found to possess superior strength in the against-grain direction.

EXAMPLE 15

Substantially the procedure of Example 14 is repeated except that the coated mandrel is heated to 3,150°C without pressure to produce useful structural members having properties similar to the composites produced according to Example 14.

Various modifications will be apparent to those skilled in the art and can be resorted to without departing from the spirit and scope of the invention and hence the invention is not to be taken as limited except as defined by the following claims.

We claim:

1. Process for producing a composite having low thermal expansion, high resistance to thermal shock and high flexural strength, comprising:
immersing yarn of a continuous length selected from the group consisting of amorphous carbon, graphite, and pyrolytic graphite yarn, said yarn composed of fibers having a diameter ranging from about 0.125 inch to about 0.000026 inch, continuously through a coating composition in the form of a slurry comprising:
  a. a refractory metal compound or refractory metal compound mixture, in the form of particles of a size not larger than about 0.6 micron, said refractory metal compound being stable at high temperatures and forming a high melting compound, and being selected from the group consisting of the carbides, borides and silicides, of niobium, tantalum, zirconium, titanium, vanadium, molybdenum, hafnium, tungsten, rhenium, uranium, thorium, plutonium, promethium, boron, silicon, and mixtures thereof;
  b. a binder for adhesively bonding said particles of refractory metal compound to said yarn, sufficient said binder being employed to form a slurry; and
  c. additional metal of said refractory metal compound, in an amount which is stoichiometrically calculated to react with the carbon present in said binder;
forming a coating on said yarn;
forming the coated yarn to a desired shape, and
heating the shaped coated yarn at a temperature in the range of from about 40% to about 98% of the melting point of the refractory metal compound or refractory metal compound mixture, thereby producing a composite comprising a dispersion of said yarn in a matrix of said refractory metal compound.

2. The process of claim 1, wherein said fibers have a diameter in the range of from about 2 microns to about 15 microns, the particle size of said refractory metal compound is in the range of from about 0.0004 to about 0.6000 micron, the particle size of said refractory metal compound is less than about one-tenth the diameter of the fiber, and wherein said fibers are graphite fibers, said refractory metal compound is niobium carbide and said binder is a furfuryl alcohol resin.

3. An article in the form of a composite having a low coefficient of thermal expansion, low compressive creep and high flexural strength, comprising a dispersion of fibers selected from the group consisting of amorphous carbon fibers, graphite fibers and pyrolytic graphite fibers, said fibers having a diameter ranging from about 0.125 inch to about 0.000026 inch, in a matrix of a refractory metal compound selected from the group consisting of the carbides, borides and silicides, of niobium, tantalum, zirconium, titanium, vanadium, molybdenum, hafnium, tungsten, rhenium, uranium, thorium, plutonium, promethium, boron, silicon, and mixtures thereof, produced by the process, of claim 1.

4. An article as defined in claim 3, said fibers being graphite fibers, said graphite fibers having a diameter in a range of from about 2 microns to about 15 microns, said refractory metal compound being niobium carbide having a particle size in the range of from about 0.0004 micron to about 0.6 micron, and the particle size of said niobium carbide being less than about one-tenth the diameter of the fiber.

* * * * *